Figure 1:
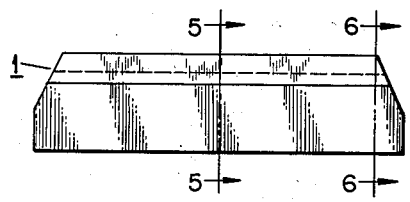

Jan. 25, 1955

S. S. RICE 2,700,707

CURRENT COLLECTOR

Filed Aug. 3, 1950

INVENTOR.
SEYMOUR S. RICE
BY
ATTORNEY

United States Patent Office 2,700,707
Patented Jan. 25, 1955

2,700,707

CURRENT COLLECTOR

Seymour S. Rice, Mansfield, Ohio, assignor to The Ohio Brass Company, Mansfield, Ohio, a corporation of New Jersey Application August 3, 1950, Serial No. 177,370

6 Claims. (Cl. 191—59.1)

This invention relates to current collecting from a trolley wire and has reference to a holder of metal and in particular a replaceable insert for the holder.

The insert is preferably formed with a body of a non-metallic current conductor such as carbon or graphite. Experience shows that an insert of carbonaceous material, under certain operating conditions forms a narrow groove sufficient for the trolley wire during use as the collector moves along the trolley wire with the insert contacting therewith under pressure.

At certain points along the trolley wire there are places where the insert meets with overhead trolley fittings which are wider than the diameter of the trolley wire, such places are at supporting ears, clamps for the trolley wire and at crossings and frogs.

This grooving of the insert to the width of the diameter of the trolley wire is due to the trolley wire constituting as much as 90 per cent of the over head construction along which the insert moves, hence there is little or no chance for the groove to widen further than the diameter of the trolley wire.

The narrow groove formed in an insert creates a wedging action between the insert and overhead fittings as the insert contacts same and very often results in the cracking and breakage of the sides of the insert forming the groove. This may cause dewirements of the current collector as well as undue wear upon the contact portion of the fittings and premature shattering of the insert.

The points of the insert at which cracking or breakage may occur are indeterminate with the present day insert and such defects may occur either lengthwise or crosswise of the entire insert as it is of a frangible carbonaceous material and often the entire insert is lost out of the holder while the vehicle is in use.

An object of this invention is to provide an insert having means to cause the upper portion of the insert to break away along its sides at a predetermined line near the top of the insert as the groove wears deeper and thereby leave the lower major portion of the insert intact for further use.

Another object of this invention is to provide means to maintain the lower portion of the insert intact against breaking away, even through it may become cracked through the formation of a new groove as it travels along the trolley wire or a deepening of the original groove.

If the lower portion of the insert can be maintained intact, although cracks occur, the use of the insert may be continued for the full expected life of the insert.

Figure 2:
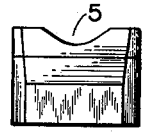
Figure 5:
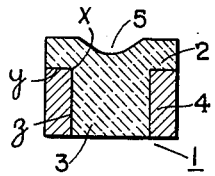
Figure 3:
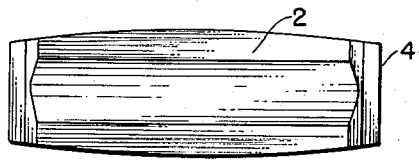
Figure 6:
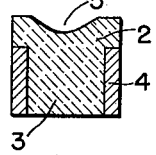
Figure 5A:
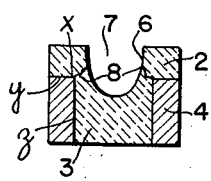
Figure 4:
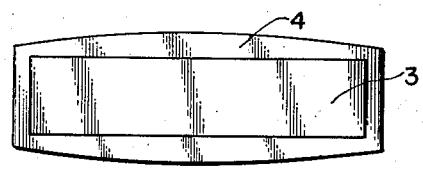
Figure 6A:
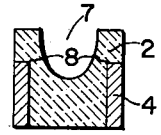

This invention resides in the new and useful construction, combination and relation of the various parts of the insert as set forth in the specification and shown in the accompanying drawings:

In the drawing:
Fig. 1 is a side view in elevation of the insert.
Fig. 2 is an end view of Fig. 1.
Fig. 3 is a top plan view of Fig. 1.
Fig. 4 is a bottom view of Fig. 1.
Fig. 5 is a mid sectional view on the line 5—5 of Fig. 1.
Fig. 6 is a sectional view of the insert on the line 6—6 of Fig. 1.
Figs. 5A and 6A show by cleavage lines where the stated upper portion of the insert will break away in the proposed construction herein disclosed; the sectional views are taken on the lines 5—5 and 6—6 respectively.

Figure 7:
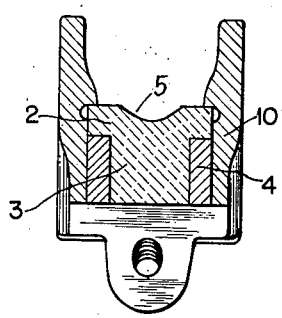
Figure 8:
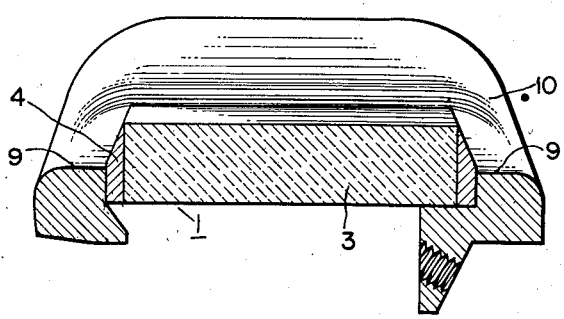

Fig. 7 is a transverse sectional view of the proposed insert mounted in a metal holder.
Fig. 8 is a central longitudinal sectional view of the herein proposed insert mounted in a metal holder.

While the insert is shown in Fig. 3 as of a boat-shaped construction, this feature is not a part of this invention as the proposed insert may be of uniform width throughout its length. The boat-shaped insert together with a holder is disclosed in U. S. Patent 2,185,270.

This invention provides for a body 1 of carbonaceous material which may or may not have mixed therewith a disintegrated metal such as copper, iron, or some other metal which will withstand the firing temperature to which the body is subjected or the body of carbon may be impregnated under pressure with a molten metal such as a babbitt, after the body has been formed.

The body is considered as having two integrally formed portions, an upper portion 2 and a lower portion 3. The upper portion is of the full width of the insert while the lower portion is of less width than that of the insert at any point but is of uniform width throughout its length. This is true in case the insert is boat-shaped or of uniform width.

The plane of demarcation between the upper and the lower portions 2 and 3 is determined by experiment and actual service trials and in an insert of ¾ inch height, it has been found that the lower portion may as illustrated have a height of about 9/16 inch.

The width of the lower portion 3 is less than that of the upper portion 2 and the cut-away portion of the body is filled out with a metal 4 whereby the side faces of the two portions of the insert will be of uniform width throughout the length and height thereof.

This metal filling extends across the ends of the body and to a height the same as that of the side filling thus connecting the side fillings and forming a closed jacket 4 extending around the vertical sides of the body to the said predetermined height of the lower portion and engaging the projections of the upper portion thus supporting same.

This jacket is applied after the body has been formed and fired and is the result of placing the body in a proper mold and then filling the space around the lower portion prepared for the metal jacket with molten metal, preferably one of the so called soft white metals or alloy thereof for example lead 85%, antimony 13% and tin 2%.

The groove 5 in a new insert is quite shallow, namely about ⅛ inch, but in service the groove will increase in depth; the thickness of the body material connecting the upper and lower wear portions between the groove surface 6 and the jacket 4 will decrease. As this wear takes place, the integral union between the upper portion 2 and the lower portion 3 of the body will decrease and eventually the upper portion will be formed into two parts with separate connections with the lower portion and the said connections will be correspondingly weakened (see Figs. 5A and 6A) until a point is reached where the side walls will break away as the result of the wedging action of the aforesaid fittings with respect to the narrow groove 7, the fittings being thicker than the diameter of the trolley wire.

This break away of the upper portion 2 is assisted by the relative construction of the upper and the lower portions 2 and 3 in that the longitudinal edge $x$ of the dihedral angles formed by the meeting of the planes of the surfaces $y$ and $z$ produces a sharp corner acting like a scratch on a piece of glass.

This break will occur along the ragged line 8 and the remaining portions of the upper portion 2 will fall away as there is no bond between the body and the holder.

This will leave the lower portion 3 intact for further use, but should this portion be cracked the jacket 4 will hold the parts together until the groove has worn down to the end walls 9 of the holder 10 when the remaining portion should be replaced with a new insert, the old insert having served its full usefulness. The side walls of the holder 10 engage and brace the sides of the upper portion 2.

In the present commercial inserts in which there is no metal jacket or no demarcation between parts of the body as established by the jacket, the cracking of the insert invariably leads to portions of the body breaking away and falling out of the holder leaving the remaining portion very irregular causing the groove to take a biased position as the groove wears deeper, thus requiring the removal of the insert before it has served its full intended life.

Having described the invention what I wish to protect is set forth in the appended claims.

I claim:

1. In combination, an insert having an elongated body formed of carbonaceous material and having an upper portion and an integrally connected lower portion of less width than the upper portion, the end portions of the upper portion projecting laterally from the lower portion, a metal holder with a recess to receive the insert, the holder having upstanding side walls in engagement with the side faces of the upper portion of the body, metallic means interposed between the side faces of the lower body portion and the said upstanding walls, the metallic means made to engage with and support the projecting end parts of the upper body portion, a groove in the said upper portion to receive a trolley wire, the holder and the insert being so constructed and arranged that the integral connection between the upper portion and the lower portion will break away as the groove wears deeper and the lower portion will remain intact as the groove wears still deeper.

2. A current collector comprising in combination a metal holder having an elongated recess with open top and bottom, and side walls higher than the end walls, a separately formed renewable insert having a body of frangible current conducting material positioned in the recess, the upper portion of the insert body having the width of the recess, the lower portion of the insert body being of less width than that of the recess and also of the upper portion of the insert body, the upper portion projecting laterally from the lower portion whereby the projecting parts of the upper portion present exposed lower faces, each side wall of the holder formed with a ridge overlapping the adjacent upper longitudinal edge of the upper portion, and a filler of metal dissimilar to that of the holder positioned in and filling the space between the side faces of the lower portion of the insert and the adjacent side walls of the holder recess and contacting the exposed lower faces of the projecting parts of the upper portion of the insert and supporting the said projecting parts, a shallow longitudinal groove formed in the upper face of the insert body adapted to receive a trolley wire, the groove in the upper portion subject to wear as the insert moves along the trolley wire thereby weakening the upper portion, whereupon the upper portion of the insert body will break along the longitudinal upper-inner edge of the metal filler and fallaway when the groove has worn to a predetermined depth.

3. A current collector comprising, an elongated frangible current conducting body of carbonaceous material, the body having an upper portion formed integral with a lower portion, the upper portion being of greater width than the lower portion and the lower portion being of greater height than the upper portion, the upper portion projecting laterally from each side of the lower portion, a metal filling positioned on each side of the lower portion and extending for the length of the lower portion and of a thickness equal to the lateral projection of the upper portion and of a height equal to the height of the lower portion, a metal holder for the frangible body and metal filling, the holder being of a metal dissimilar to that of the metal filling and having upstanding side walls of greater height than that of the body and having end walls, the several walls forming a recess in which the said body and metal filling are positioned with the upper face of the upper portion exposed, the side walls projecting above the body to prevent dewirement of the collector as it moves along a trolley wire, the frangible body having a shallow longitudinal groove in the upper face thereof to center the trolley wire with respect to the said body, the said body being subject to wear as it moves along the trolley wire thereby increasing the depth of the groove, whereby the said upper portion will break and fallaway when the groove has worn to a depth of substantially the vertical thickness of the upper portion, the side walls of the holder supporting the upper portion of the frangible body until the groove has worn to the said depth.

4. In combination, a metal holder for a current collector and having end and upstanding side walls forming a receptacle, an insert having a body of carbonaceous material positioned in the receptacle of the holder and subject to wear as the insert engages with and moves along a trolley wire, the body having an upper wear portion integral with a lower wear portion of less transverse width than that of the upper portion, whereby the upper portion projects laterally beyond the lower portion, the upper portion being of less height than that of the lower portion, the upper portion having an originally shallow groove in its exposed surface to receive a trolley wire, the groove wearing deeper as the body moves along the trolley wire thereby gradually intersecting the upper portion and the integral union between the said upper and the lower portion until the upper portion becomes two parts which eventually break away from the insert and holder when their union therewith becomes sufficiently weakened, the insert being also provided with a metallic jacket surrounding the lower portion of the body and of such thickness as to make the width of the lower portion throughout its height the same as the width of the upper portion of the body and supporting the projecting parts of the upper wear portion from below.

5. In combination, a renewable insert for a current collector including, a frangible body of current conducting material, a metal holder provided with upstanding side walls and end walls of less height than the side walls forming an open top and bottom receptacle to receive the insert, the walls so arranged as to engage the insert and prevent its displacement, the said body provided with two rectangular integrally united portions, an upper wear portion and a lower wear portion of less lateral width than the upper portion thereby providing laterally projecting parts of the upper portion, the plane of the integral union between the upper and the lower portions positioned above and in spaced relation to the end walls of the holder, a shallow groove in one face of the upper portion when new to receive a trolley wire and which groove wears deeper as the body moves along the trolley wire thereby dividing the upper portion into two parts which eventually break away from the lower portion when the groove has worn to a depth to sufficiently weaken the integral union between the lower potrion and the said parts, leaving the lower portion intact for contact with the trolley wire to collect current therefrom until a groove has worn into the lower portion to a depth limited only by the said end walls, the side walls of the holder engaging the side faces of the projecting parts of the upper portion to aid in holding the upper portion intact until the groove has worn sufficiently deep to so weaken the upper portion that it will break and fall away, and other metallic means secured to the lower portion of the frangible body in engagement with the lower faces of the projecting parts of the upper portion to further aid the holder to hold the upper portion intact and to also engage the side faces of the lower portion to hold the lower portion intact while being grooved through moving contact with the trolley wire.

6. A current collector comprising, a metal holder having side and end walls, the side walls being higher than the end walls, an elongated insert positioned between the walls and formed of a frangible current conducting material subject to wear, the insert so formed and constructed as to provide an upper wear portion and a lower wear portion integrally united, the upper wear portion being of less height than that of the lower wear portion and of greater width than that of the lower portion and projecting laterally from each side of the lower portion, the intersecting planes of the adjoining faces of the upper and lower portions forming dihedral angles, the upper surface of the upper portion provided with a shallow groove to receive and guide the insert along a trolley wire, the groove becoming deeper as the insert material wears away dividing the upper portion into two laterally disposed parts and weakening the upper portion whereupon the said parts are free to break away from the lower portion when the groove has worn sufficiently deep leaving the lower portion intact, the side faces of the lower portion being spaced from the adjacent side walls of the holder and metallic means filling said space.

References Cited in the file of this patent

UNITED STATES PATENTS

| | | |
|---|---|---|
| 2,169,154 | Lapham | Aug. 8, 1939 |
| 2,185,270 | Ryan | Jan. 2, 1940 |
| 2,305,297 | Leuchs | Dec. 15, 1942 |
| 2,369,837 | Mead | Feb. 20, 1945 |

FOREIGN PATENTS

| | | |
|---|---|---|
| 466,423 | Germany | Oct. 6, 1928 |
| 650,707 | Germany | Sept. 30, 1937 |
| 684,799 | Germany | Dec. 6, 1939 |
| 204,680 | Switzerland | Aug. 16, 1939 |

OTHER REFERENCES

Serial No. 309,108, abandoned, Conradty (A. P. C.), published May 18, 1943.